(12) United States Patent
Pilgrim

(10) Patent No.: US 9,526,203 B1
(45) Date of Patent: Dec. 27, 2016

(54) FORK AND SHOVEL COMBINATION ASSEMBLY

(71) Applicant: John W. Pilgrim, Los Angeles, CA (US)

(72) Inventor: John W. Pilgrim, Los Angeles, CA (US)

( * ) Notice: Subject to any disclaimer, the term of this patent is extended or adjusted under 35 U.S.C. 154(b) by 0 days.

(21) Appl. No.: 14/744,266

(22) Filed: Jun. 19, 2015

(51) Int. Cl.
*A01D 9/06* (2006.01)
*A01D 11/04* (2006.01)
*A01D 9/02* (2006.01)
*A01B 1/20* (2006.01)

(52) U.S. Cl.
CPC ............... *A01D 11/04* (2013.01); *A01B 1/20* (2013.01); *A01D 9/02* (2013.01)

(58) Field of Classification Search
CPC ............ A01D 80/00; A01D 7/06; A01D 7/04; A01D 11/06; A01D 11/04; A01D 9/02; A01B 1/16; A01B 1/02; A01B 1/20; E01H 5/02
USPC ......................................... 294/50; D8/1, 10
See application file for complete search history.

(56) References Cited

U.S. PATENT DOCUMENTS

| | | | | |
|---|---|---|---|---|
| 530,892 A * | 12/1894 | Fuller | ............... | A01B 1/022 294/51 |
| 818,100 A * | 4/1906 | Kormil et al. | ........... | A01D 9/00 294/55.5 |
| 1,107,583 A * | 8/1914 | Burchell | ............... | A01B 1/022 294/51 |
| 2,347,911 A * | 5/1944 | Kingston | ................. | A01D 7/04 403/103 |
| 2,537,365 A | 1/1951 | Montayon | | |
| 3,310,332 A * | 3/1967 | Nelson | ................. | E01H 1/1206 294/1.4 |
| 5,033,782 A | 7/1991 | Hirzel | | |
| 5,401,071 A | 3/1995 | Tummino et al. | | |
| 5,799,998 A | 9/1998 | Gitterman, III | | |
| D427,495 S | 7/2000 | Lee, Jr. | | |
| 7,644,569 B2 | 1/2010 | Lesche | | |
| 2011/0067375 A1* | 3/2011 | Madaffer | ................. | A01D 7/04 56/400.16 |

* cited by examiner

*Primary Examiner* — Stephen Vu

(57) ABSTRACT

A fork and shovel combination assembly includes a frame with a first wall and a second wall. The first wall has a first edge and a second edge positioned opposite of each other. The second wall has a proximal edge attached to and being continuous with the second edge. The first wall has a front surface and a rear surface and the second wall has a first surface forming a 90° angle with the front surface. A handle is attached to the rear surface of the first wall and is oriented perpendicular to the rear surface. A plurality of linear tines is attached to the frame and extends forward therefrom. Each of the tines has an attached end abutting the front surface and each tine abuts the first surface. The tines are each oriented parallel to the longitudinal axis of the handle.

12 Claims, 3 Drawing Sheets

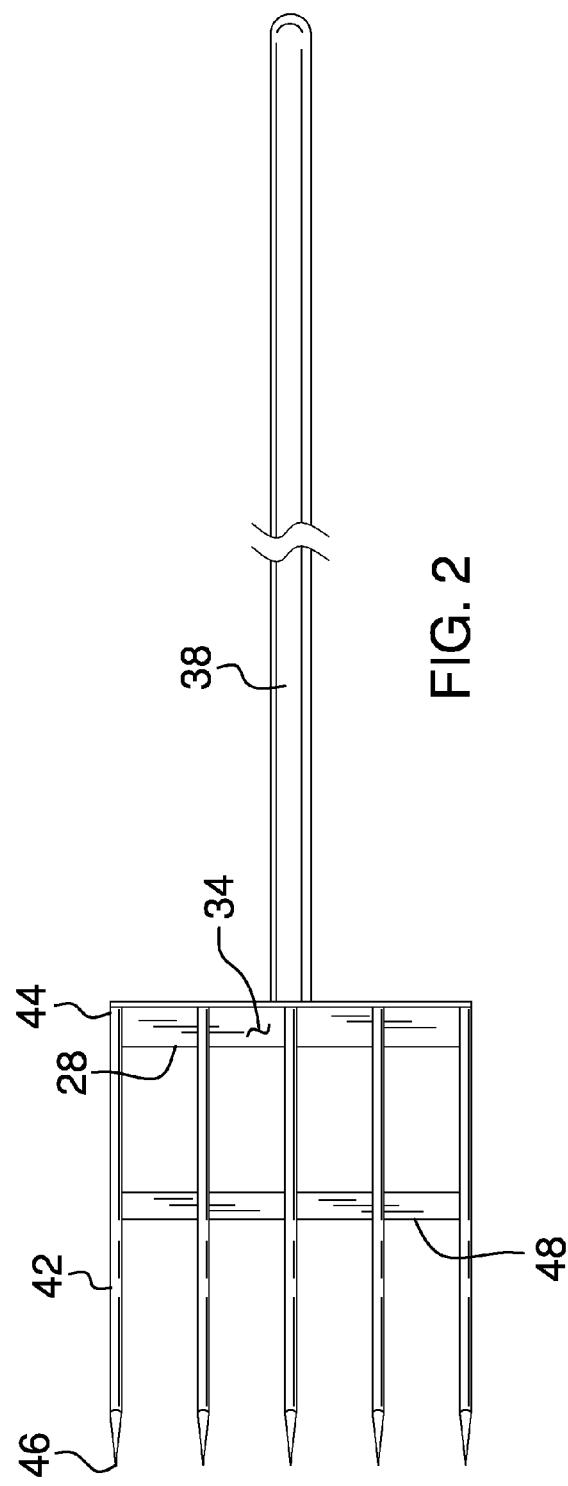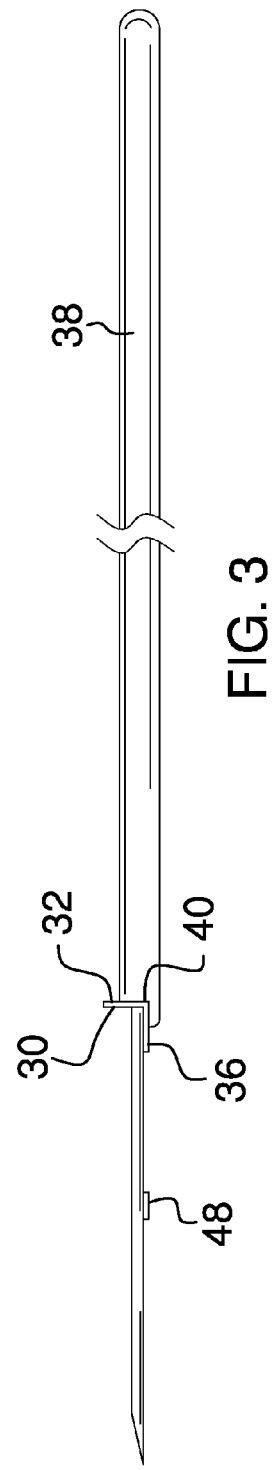

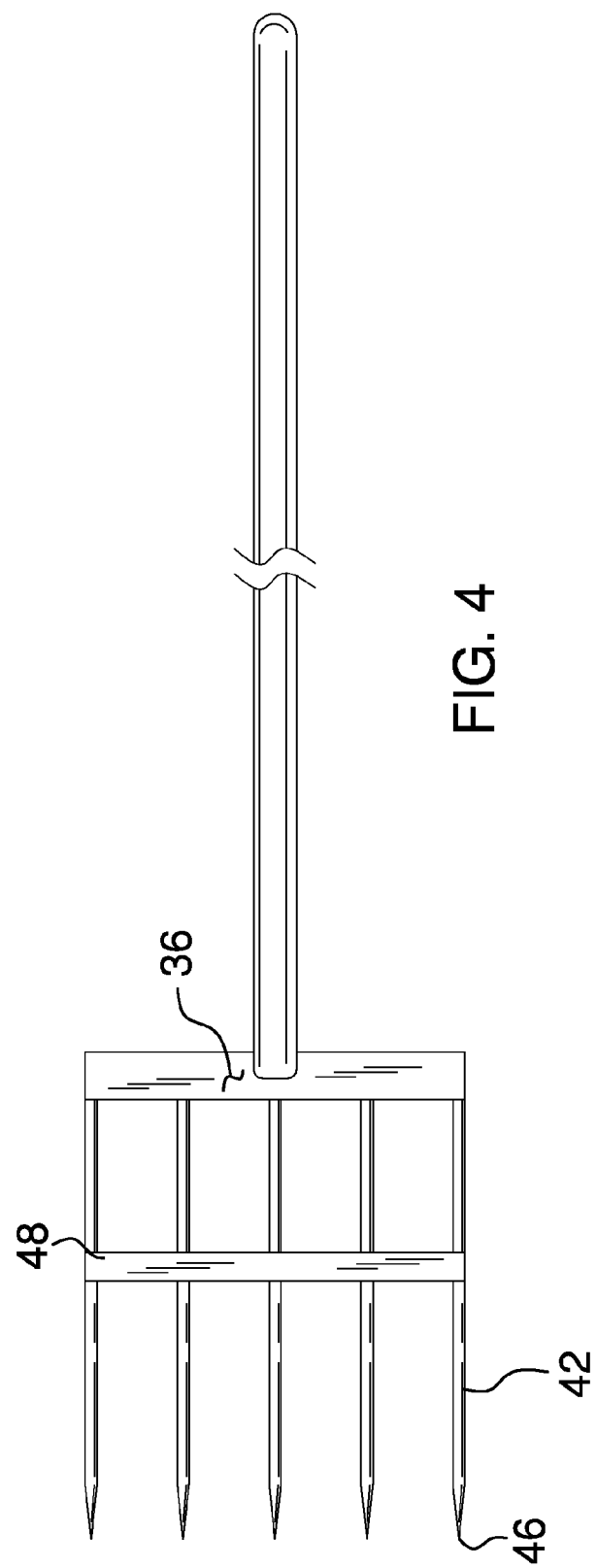

FORK AND SHOVEL COMBINATION ASSEMBLY

BACKGROUND OF THE DISCLOSURE

Field of the Disclosure

The disclosure relates to fork and shovel devices and more particularly pertains to a new fork and shovel device for assisting a person in moving materials and in particular soil containing plant matter such as root networks.

SUMMARY OF THE DISCLOSURE

An embodiment of the disclosure meets the needs presented above by generally comprising a frame with a first wall and a second wall. The first wall has a first edge, a second edge, a third edge and a fourth edge wherein the first and second edges are positioned opposite of each other and elongated. The second wall has a proximal edge and a distal edge with respect to the first wall. The proximal edge is attached to and is continuous with the first edge. The first wall has a front surface and a rear surface and the second wall has a first surface and a second surface. The first surface and the front surface forming an angle substantially equal to 90°. A handle is attached to and extends away from the rear surface of the first wall. The handle has a longitudinal axis oriented perpendicular to the rear surface. A plurality of tines is attached to the frame and extends forward therefrom. Each of the tines has an attached end and a free end. Each of the attached ends abuts the front surface and each of the tines abuts the first surface. The tines are linear from the attached ends to associated ones of the free ends and each is oriented parallel to the longitudinal axis of the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a side view of an embodiment of the disclosure.

FIG. 4 is a bottom view of an embodiment of the disclosure.

DESCRIPTION OF THE PREFERRED EMBODIMENT

Figure 1:
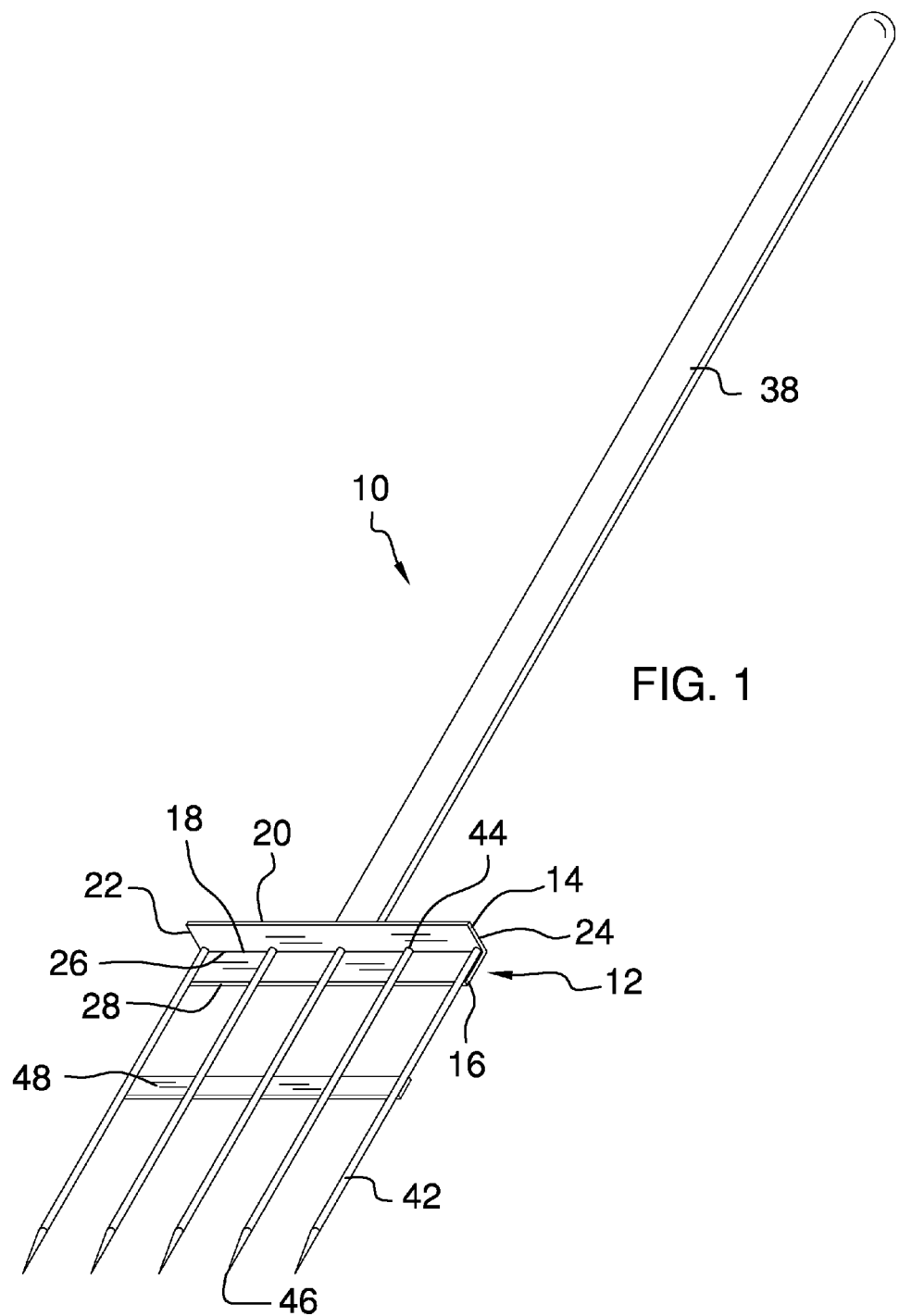
FIG. 1 is a front perspective view of a fork and shovel combination assembly according to an embodiment of the disclosure.

With reference now to the drawings, and in particular to FIGS. 1 through 4 thereof, a new fork and shovel device embodying the principles and concepts of an embodiment of the disclosure and generally designated by the reference numeral 10 will be described.

As best illustrated in FIGS. 1 through 4, the fork and shovel combination assembly 10 generally comprises a frame 12 including a first wall 14 and a second wall 16. The first wall 14 has a first edge 18, a second edge 20, a third edge 22 and a fourth edge 24 wherein the first 18 and second 20 edges are positioned opposite of each other and elongated. The second wall 16 has a proximal edge 26 and a distal edge 28 with respect to the first wall 14. The proximal edge 26 is attached to and is continuous with the first edge 18. The first wall 14 has a front surface 30 and a rear surface 32 and the second wall 16 has a first surface 34 and a second surface 36 so that the first surface 34 and the front surface 30 forms an angle substantially equal to 90°. The first 14 and second 16 walls have an equal length and a length of the first wall 14 from the third edge 22 to the fourth edge 24 may be between 6.0 inches and 16.0 inches. The first wall 14 has a height from the first edge 18 to the second edge 20 between 1.0 inches and 4.0 inches and the second wall 16 has a width from the distal edge 28 to the proximal edge 26 between 1.0 inches and 4.0 inches. The first 14 and second 16 walls are preferably comprised of metal such as iron or steel and are either welded together or are formed as unitary piece of material.

A handle 38 is attached to and extends away from the rear surface 32 of the first wall 14. The handle 38 is elongated and may have a cylindrical shape. The handle 38 extends away from the first wall 14 a distance of at least 3.0 feet and the handle 38 has a longitudinal axis is oriented perpendicular to the rear surface 32. The handle 38 may be comprised of any conventional material though metallic materials or fiberglass may be preferred. The handle 38 has a proximal end with respect to the frame 12 which may include a notch 40 to receive a juncture of the first 14 and second 16 walls such that a portion of the handle 38 abuts the second surface 36 of the second wall 16 as shown in FIG. 3.

A plurality of tines 42 is attached to the frame 12 and extends forward therefrom. Each of the tines 42 has an attached end 44 and a free end 46. Each of the attached ends 44 abuts the front surface 30 and each of the tines 42 abuts the first surface 34. The tines 42 are preferably comprised of metallic material and may be the same material as the frame. The tines 42 may therefore be welded to the frame 12 or formed as a unitary structure with the frame. Each of the free ends 46 is pointed and each of the tines 42 is linear from the attached ends 44 to associated ones of the free ends 46. The tines 42 are each oriented parallel to the longitudinal axis of the handle. The tines 42 are cylindrically shaped and may extend between 6.0 inches and 18.0 inches from the distal edge 28 of the second wall 16. The tines 42 may have same length and width with respect to each other and having a width, or diameter, being less than 0.5 inches along the majority of their lengths.

A panel 48 is attached and extends between the tines 42 for reinforcement and for lifting material such that the panel 48 is oriented perpendicular to the tines 42. The panel 48 is co-planar with the second wall 16 and has a width between 1.0 inches and 4.0 inches measured along a line oriented parallel to the tines 42. The panel 48 is spaced from each of the free ends 46 of the tines 42 and the second wall 16 a distance of at least 3.0 inches.

In use, the assembly 10 is used in a conventional manner as shovel would be used but will the added benefit being able to use the tines 42 as a fork. The usage of the tines 42, the construction of the frame 12, and the orientation of the tines 42 and frame 12 with respect each other and to the handle 38 provides for a strong tool which will not easily allow the handle 38 to be broken.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fork and shovel combination device comprising:
a frame including a first wall and a second wall, said first wall having a first edge, a second edge, a third edge and a fourth edge wherein said first and second edges are positioned opposite of each other and elongated, said second wall having a proximal edge and a distal edge with respect to said first wall, said proximal edge being attached to and being continuous with said first edge, said first wall having a front surface and a rear surface and said second wall having a first surface and a second surface, said first surface and said front surface forming an angle substantially equal to 90°;
a handle being attached to and extending away from said rear surface of said first wall, said handle having a longitudinal axis being oriented perpendicular to said rear surface; and
a plurality of tines being attached to said frame and extending forward therefrom, each of said tines having an attached end and a free end, each of said attached ends abutting said front surface, each of said tines abutting said first surface, each of said tines being linear from said attached ends to associated ones of said free ends, each of said tines being coplanar with and oriented parallel to said longitudinal axis of said handle.

2. The fork and shovel combination device according to claim 1, wherein said first and second walls have an equal length, a length of said first wall from said third edge to said fourth edge being between 6.0 inches and 16.0 inches.

3. The fork and shovel combination device according to claim 2, wherein said first wall has a height from said first edge to said second edge between 1.0 inches and 4.0 inches, said second wall having a width from said distal edge to said proximal edge between 1.0 inches and 4.0 inches.

4. The fork and shovel combination device according to claim 3, wherein said handle extends away from said first wall a distance of at least 3.0 feet.

5. The fork and shovel combination device according to claim 4, wherein each of said tines extends between 6.0 inches and 18.0 inches from said distal edge of said second wall.

6. The fork and shovel combination device according to claim 5, further including a panel being attached and extending between said tines such that said panel is oriented perpendicular to said tines.

7. The fork and shovel combination device according to claim 6, wherein said panel is co-planar with said second wall.

8. The fork and shovel combination device according to claim 7, wherein said panel has a width between 1.0 inches and 4.0 inches, said panel being spaced from each of said free ends of said tines and said second wall a distance of at least 3.0 inches.

9. The fork and shovel combination device according to claim 1, wherein each of said free ends is pointed.

10. The fork and shovel combination device according to claim 1, further including a panel being attached and extending between said tines such that said panel is oriented perpendicular to said tines.

11. The fork and shovel combination device according to claim 10, wherein said panel is co-planar with said second wall.

12. A fork and shovel combination device comprising:
a frame including a first wall and a second wall, said first wall having a first edge, a second edge, a third edge and a fourth edge wherein said first and second edges are positioned opposite of each other and elongated, said second wall having a proximal edge and a distal edge with respect to said first wall, said proximal edge being attached to and being continuous with said first edge, said first wall having a front surface and a rear surface and said second wall having a first surface and a second surface, said first surface and said front surface forming an angle substantially equal to 90°, said first and second walls having an equal length, a length of said first wall from said third edge to said fourth edge being between 6.0 inches and 16.0 inches, said first wall having a height from said first edge to said second edge between 1.0 inches and 4.0 inches, said second wall having a width from said distal edge to said proximal edge between 1.0 inches and 4.0 inches;
a handle being attached to and extending away from said rear surface of said first wall, said handle being elongated and cylindrical, said handle extending away from said first wall a distance of at least 3.0 feet, said handle having a longitudinal axis being oriented perpendicular to said rear surface;
a plurality of tines being attached to said frame and extending forward therefrom, each of said tines having an attached end and a free end, each of said attached ends abutting said front surface, each of said tines abutting said first surface, each of said free ends being pointed, each of said tines being linear from said attached ends to associated ones of said free ends, each of said tines being oriented parallel to said longitudinal axis of said handle, each of said tines extending between 6.0 inches and 18.0 inches from said distal edge of said second wall; and
a panel being attached and extending between said tines such that said panel is oriented perpendicular to said tines, said panel being co-planar with said second wall and having a width between 1.0 inches and 4.0 inches, said panel being spaced from each of said free ends of said tines and said second wall a distance of at least 3.0 inches.

* * * * *